(12) United States Patent
Kato

(10) Patent No.: US 7,836,999 B2
(45) Date of Patent: Nov. 23, 2010

(54) SUB-FRAME STRUCTURE

(75) Inventor: Takashi Kato, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/218,518

(22) Filed: Jul. 16, 2008

(65) Prior Publication Data

US 2009/0021052 A1    Jan. 22, 2009

(30) Foreign Application Priority Data

Jul. 17, 2007    (JP)    ............................. 2007-185576

(51) Int. Cl.
*B62D 21/02*    (2006.01)

(52) U.S. Cl. ...................... 180/312; 180/68.5; 280/784; 296/187.12; 296/204

(58) Field of Classification Search ................ 180/68.5, 180/312, 903, 908; 280/781, 784, 124.109; 296/187.12, 203.01, 204
See application file for complete search history.

(56) References Cited

U.S. PATENT DOCUMENTS 5,641,031 A * 6/1997 Riemer et al. ............... 429/423

6,874,588 B2 * 4/2005 Kato et al. .................. 429/413
6,994,178 B2 * 2/2006 Mizuno ....................... 429/430
2007/0007060 A1    1/2007 Ono et al.

FOREIGN PATENT DOCUMENTS

| JP | 2006-182295 | 7/2006 |
| JP | 2007-015588 | 1/2007 |
| JP | 2007-39004 | 2/2007 |

* cited by examiner

*Primary Examiner*—Eric Culbreth
*Assistant Examiner*—Joseph Rocca
(74) *Attorney, Agent, or Firm*—Carrier, Blackman & Associates P.C.; Joseph P. Carrier; William D. Blackman

(57) ABSTRACT

A sub-frame structure, which mounts a fuel cell thereon and is supported by a vehicle body, the sub-frame structure including: front and rear cross members which support front and rear ends of the fuel cell on upper surfaces thereof and extend in a vehicle width direction; an intermediate cross member that is provided between the front and rear cross members and extends in the vehicle width direction; and a pair of side members that connects the front and rear cross members and the intermediate cross member and extends along side surfaces of the fuel cell, wherein a space having a predetermined size is formed between (a) a portion of the intermediate cross member, which is provided between the pair of side members, and (b) a lower surface of the fuel cell.

11 Claims, 6 Drawing Sheets

FIG. 4
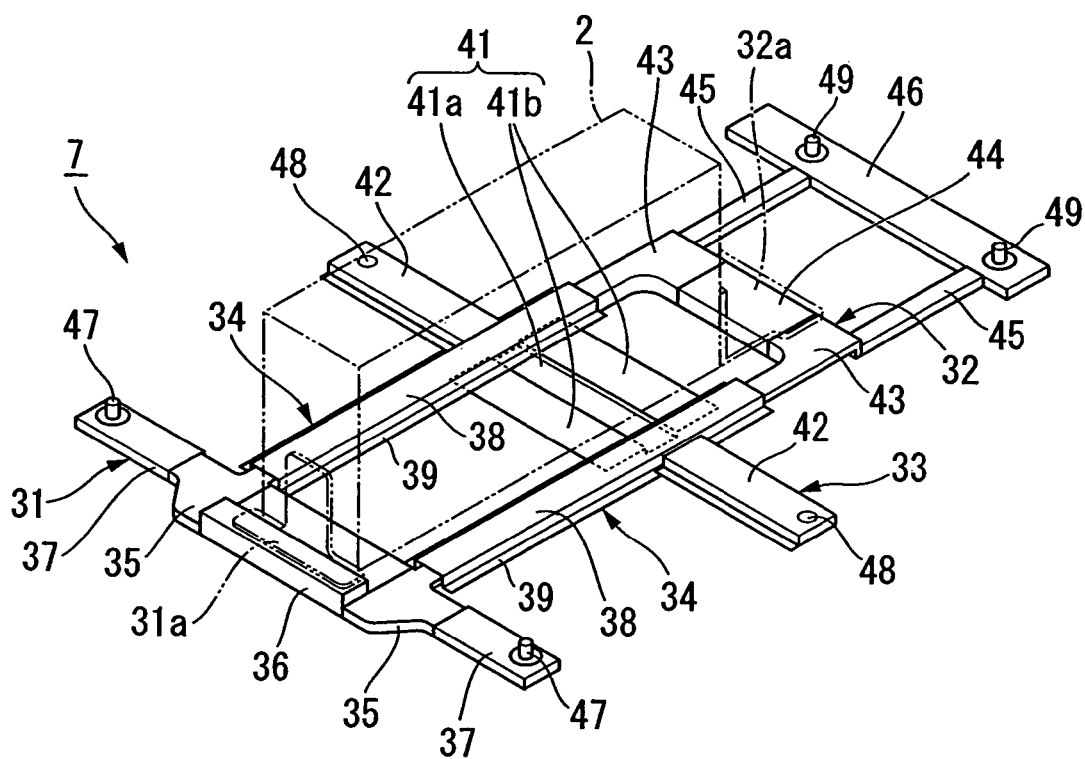
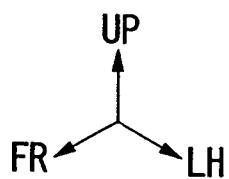

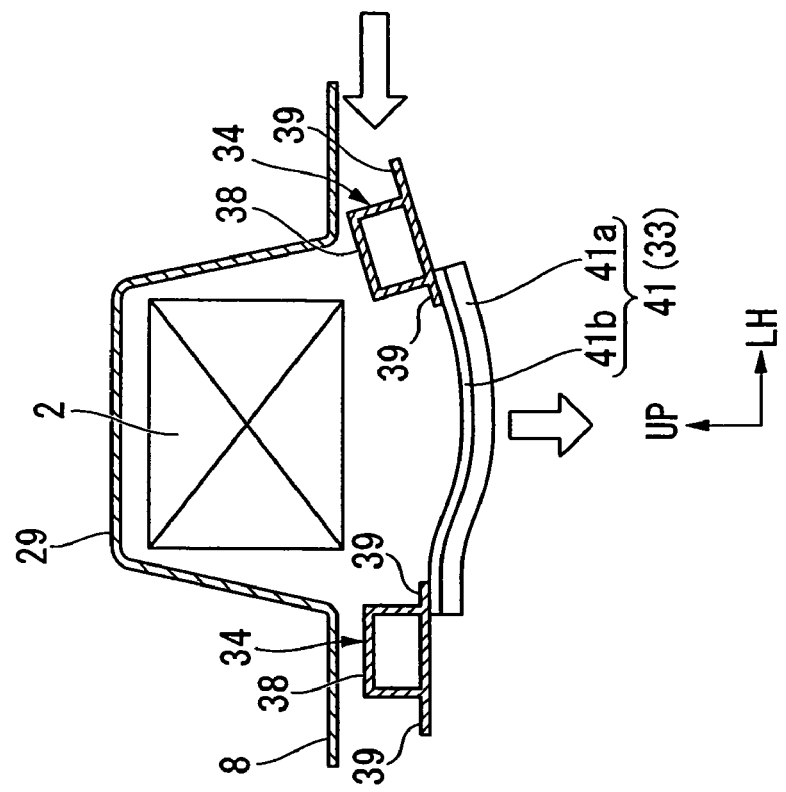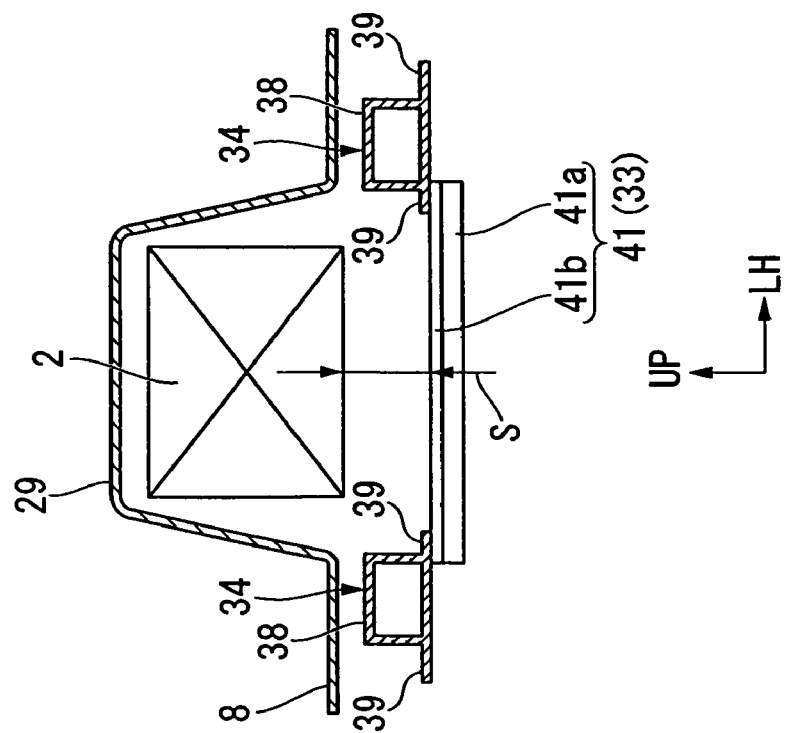

SUB-FRAME STRUCTURE

BACKGROUND OF THE INVENTION

1. Field of the Invention

The present invention relates to a sub-frame structure which mounts a fuel cell of a fuel cell vehicle thereon and is supported by a vehicle body.

Priority is claimed on Japanese Patent Application No. 2007-185576, filed Jul. 17, 2007, the contents of which are incorporated herein by reference.

2. Description of Related Art

In the past, there has been the following sub-frame structure that has the shape of a lattice in plan view (For example, see Japanese Unexamined Patent Application, First Publication No. 2007-15588). The sub-frame structure includes front and rear cross members, which support front and rear ends of a fuel cell on upper surfaces thereof and extend in a vehicle width direction, and a pair of side members that connect the front cross member with the rear cross member and extends along side surfaces of the fuel cell.

Meanwhile, in the related art, intermediate pipes, which extend in a left-right direction, are provided between the front and rear cross members and outside the left and right side members. These intermediate pipes are not provided between the left and right side members and do not support a load that is input on the side member from the side. For this reason, there are concerns that the side member having received a side collision load is easily deformed and the side collision load is transmitted to the fuel cell when the side collision of a vehicle occurs. Accordingly, there is a demand for the elimination of these concerns to also improve protection performance of the fuel cell.

An object of the present invention is to provide a sub-frame, which mounts a fuel cell thereon, is supported by a vehicle body, and suppresses the transmission of a side collision load to the fuel cell stack when the side collision of a vehicle occurs.

SUMMARY OF THE INVENTION

In order to achieve the object, the present invention employs the following.

A sub-frame structure, which mounts a fuel cell thereon and is supported by a vehicle body, the sub-frame structure including: front and rear cross members which support front and rear ends of the fuel cell on upper surfaces thereof and extend in a vehicle width direction; an intermediate cross member that is provided between the front and rear cross members and extends in the vehicle width direction; and a pair of side members that connects the front and rear cross members and the intermediate cross member, and extends along side surfaces of the fuel cell, wherein a space having a predetermined size is formed between (a) a portion of the intermediate cross member, which is provided between the pair of side members, and (b) a lower surface of the fuel cell.

According to the sub-frame structure, a load input to the side member from the side is supported by the intermediate cross member that can be positioned below the fuel cell. Accordingly, the side member does not easily deform even when the side collision of a vehicle occurs, and it is possible to suppress the transmission of a side collision load to the fuel cell. The sub-frame structure has a space having a predetermined size between the portion of the intermediate cross member, which is provided between the pair of side members, and the lower surface of the fuel cell. Accordingly, it is possible to suppress the interference between the intermediate cross member and the fuel cell even when the intermediate cross member bends due to the side collision load.

It may be arranged such that: the portion of the intermediate cross member bends downward when receiving a side collision load.

In this case, when the intermediate cross member which has received the side collision load is bent, it is possible to further suppress the interference between the intermediate cross member and the fuel cell that is provided on the intermediate cross member.

It may be arranged such that: the front cross member extends outward in the vehicle width direction, and is connected to a vehicle body frame provided in the vehicle body.

It may be arranged such that: the intermediate cross member includes an intermediate beam that has a horizontal plate member extending between the pair of side members.

It may be arranged such that: the intermediate cross member further includes an outer beam that has a closed cross-sectional shape at an outside of the intermediate beam in the vehicle width direction.

It may be arranged such that: the outer beam is connected to the vehicle body frame.

It may be arranged such that: the outer beam is connected to a side surface of the side member, and the intermediate beam is connected to a lower surface of the side member.

It may be arranged such that: the intermediate beam includes a bead that protrudes downward and extends in the vehicle width direction. It may be arranged such that: the intermediate beam protrudes downward along the vehicle width direction.

It may be arranged such that: the intermediate beam includes a notch at the upper surface thereof.

It may be arranged such that: the fuel cell is unconnected with the intermediate cross member.

BRIEF DESCRIPTION OF THE DRAWINGS

FIG. 4 is a perspective view of the sub-frame.

FIG. 5A is a cross-sectional view of the sub-frame near an intermediate sub-cross member on a surface perpendicular to a front-rear direction, and shows a normal condition.

FIG. 5B is a cross-sectional view of the sub-frame near the intermediate sub-cross member on the surface perpendicular to the front-rear direction, and shows a condition when a side collision load is input.

DETAILED DESCRIPTION OF THE INVENTION

An embodiment of the present invention will be described below with reference to drawings. Meanwhile, unless particularly described otherwise, front, rear, left, and right directions in the following description corresponds to those directions of the vehicle. Further, in drawings, an arrow FR indicates the front side of the vehicle, an arrow LH indicates the left side of the vehicle, and an arrow UP indicates the upper side of the vehicle.

Figure 1:
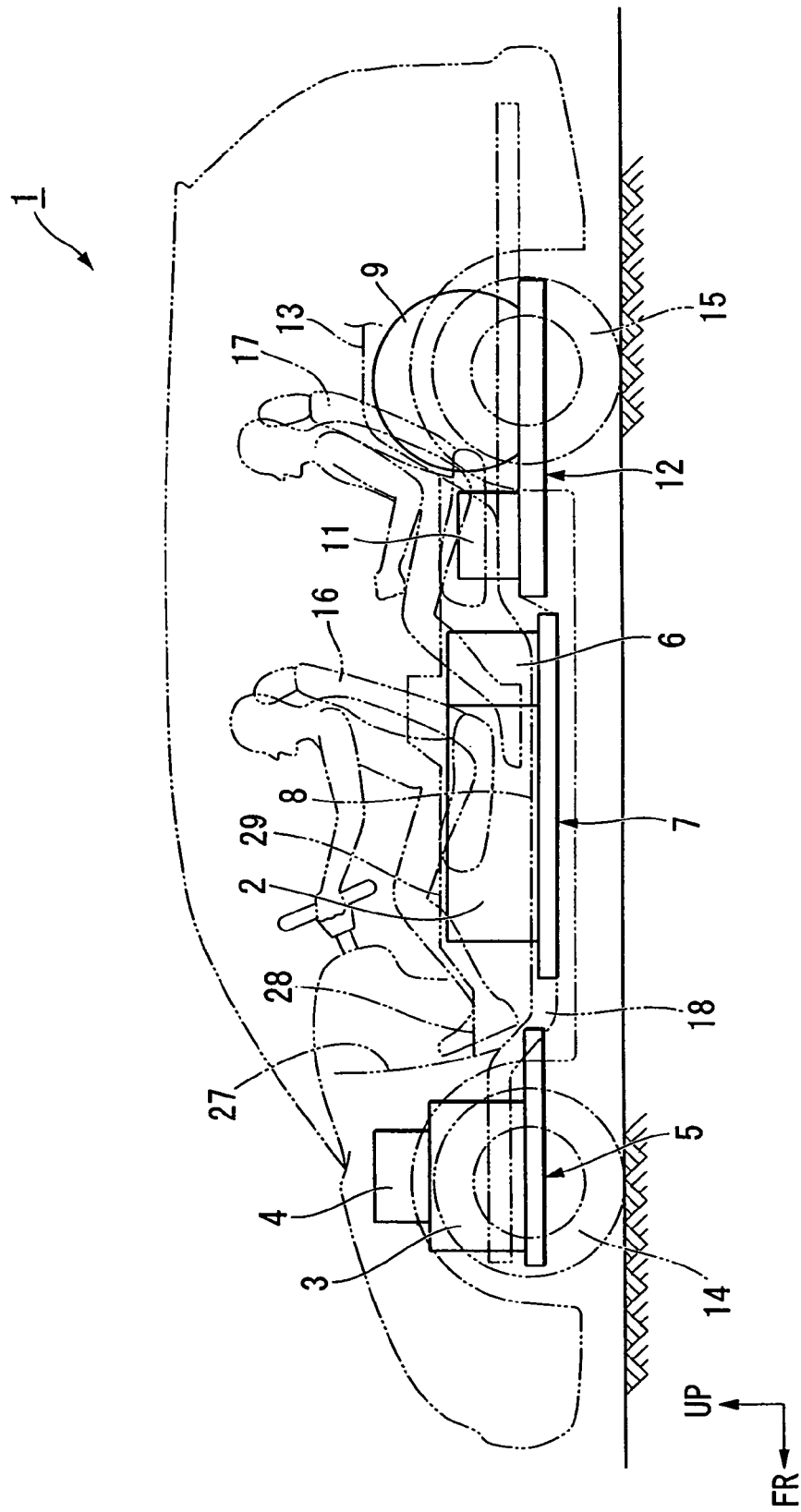
FIG. 1 is a side view of a fuel cell vehicle according to an embodiment of the invention.

In the fuel cell vehicle 1 shown in FIGS. 1 and 2, a fuel cell stack 2, which generates electric power by an electrochemical reaction between hydrogen and oxygen, is mounted below a floor of a vehicle body, and a motor 3 is driven using the electric power generated by the fuel cell stack 2, so that the fuel cell vehicle travels. In the fuel cell stack 2, a plurality of unit batteries (unit cells) is stacked, for example, in a front-rear direction of the vehicle. The unit battery is a well-known solid polymer film type fuel cell (PEMFC). Hydrogen gas is supplied to an anode of the unit battery as fuel gas, and air including oxygen is supplied to a cathode thereof as oxidant gas, so that the unit battery generates electric power and water by an electrochemical reaction.

The motor 3 is mounted on a front sub-frame 5 together with a compressor 4 that compresses the air supplied to the cathode of the fuel cell stack 2, and is disposed in a motor room (engine room) that is formed at a front portion of the vehicle body. Further, the fuel cell stack 2 and an auxiliary device 6 of the fuel cell stack 2 are mounted on the sub-frame 7 so as to be disposed outside a vehicle cabin on a floor panel 8 at an intermediate portion of the vehicle body in the front-rear direction. In addition, a hydrogen tank 9, which stores the hydrogen gas supplied to the anode of the fuel cell stack 2, is mounted on a rear sub-frame 12 together with a battery 11, which stores regenerative electric power generated from the motor 3, so as to be disposed outside the vehicle cabin below a rear floor 13 at a rear portion of the vehicle body.

Meanwhile, the auxiliary device 6 of the fuel cell stack 2 is a hydrogen supply auxiliary device such as a regulator or an ejector, and an air exhaust auxiliary device such as a humidifier or a dilution box. Further, front and rear wheels 14 and 15 of the fuel cell vehicle 1 and front and rear seats 16 and 17 provided in the vehicle cabin are shown in FIG. 1.

Left and right side frames 18 extending forward and rearward are attached to a lower surface of the floor panel 8 on both sides of the floor panel. Left and right side sills 19 extending forward and rearward are provided outside the left and right portions of the floor panel 8, respectively. A front portion, an intermediate portion in the front-rear direction, and a rear end of each of the left and right side sills 19 are attached to each of the left and right side frames 18 by front and rear outriggers 21 and 22 and an extension part 23, respectively. The front portions, the intermediate portions in the front-rear direction, and the rear ends of the left and right side frames 18 are connected to each other by a front cross member 24, an intermediate cross member 25, and a rear cross member 26 that extend in a left-right direction.

The floor panel 8 is provided between the left and right side sills 19 in the left-right direction, and is provided between a lower end of a dash lower panel 27 and a lower side of the rear seat 17 in the front-rear direction. A front end of the rear floor 13 is connected to the rear end of the floor panel 8. The rear floor 13 extends from the lower side of the rear seat 17 so as to be inclined upward, and extends rearward.

Hereinafter, FIG. 5 is also referred. A floor tunnel 28 protruding upward is formed in the middle of the floor panel 8 in a vehicle width direction (left-right direction). The floor tunnel 28 has a U-shaped cross section which opens downward, and extends forward and rearward. The rear half of the floor tunnel protrudes upward so as to form a center console 29. The fuel cell stack 2 and the auxiliary device 6 thereof, which are mounted on the sub-frame 7, are housed in the center console 29.

Figure 2:
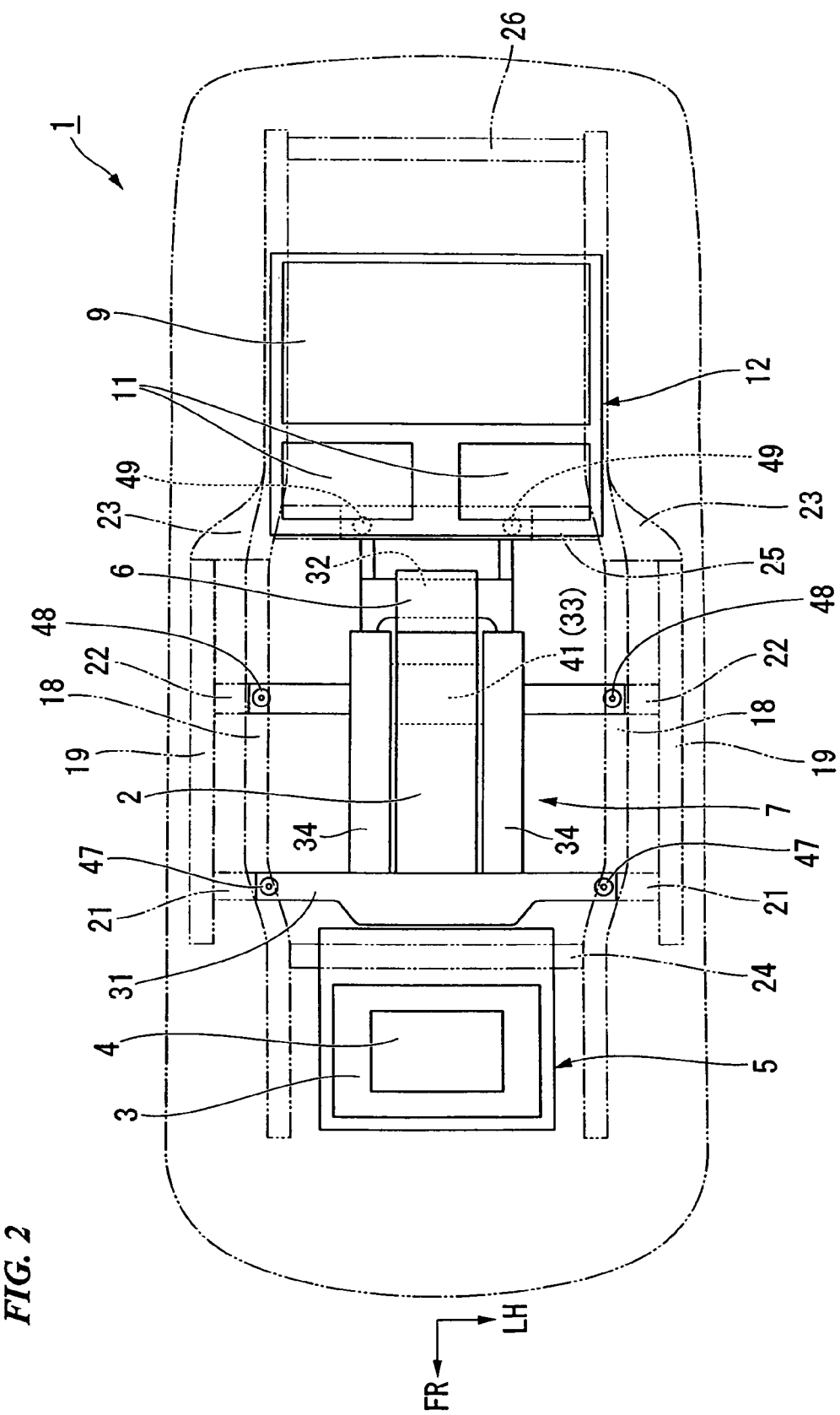
FIG. 2 is a top view of the fuel cell vehicle.

As shown in FIG. 2, the sub-frame 7 includes front and rear sub-cross members 31 and 32 that are positioned at positions corresponding to the front and rear outriggers 21 and 22 and extend in the vehicle width direction, an intermediate sub-cross member 33 that is provided between the front and rear sub-cross members 31 and 32 and extends in the vehicle width direction, and left and right sub-side members 34 that extend in the front-rear direction and connect the front sub-cross member 31, the rear sub-cross member 32, and the intermediate sub-cross member 33. The sub-frame 7 is symmetric with respect to the center of the vehicle body in the left-right direction.

Figure 3:
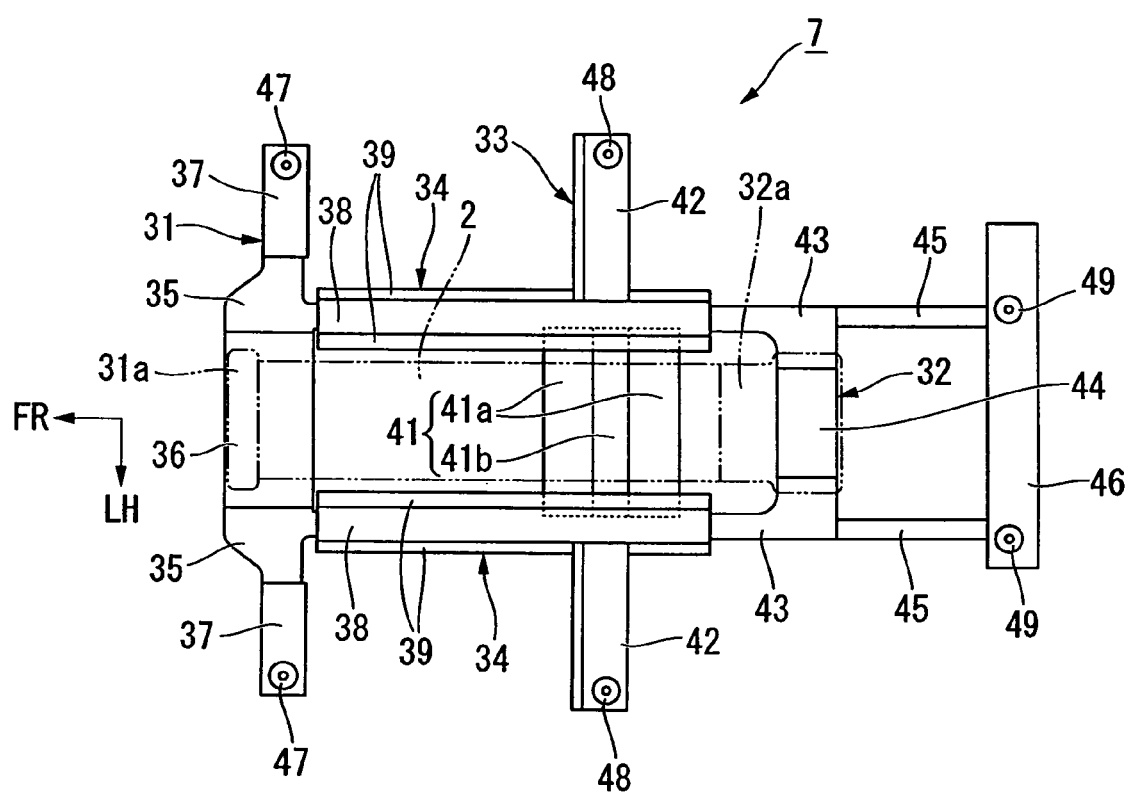
FIG. 3 is a top view of a sub-frame on which a fuel cell of the fuel cell vehicle is mounted.

As shown in FIGS. 3 and 4, the front sub-cross member 31 includes left and right connection pieces 35, an intermediate beam 36, and left and right beams 37, which are integrally connected to one another. Front ends of the left and right sub-side members 34 are attached to the left and right connection pieces from the rear side, respectively. The intermediate beam 36 extends between the left and right connection pieces 35. The left and right beams extend toward the outside of the left and right connection pieces 35. Each of the intermediate beam 36 and the left and right beams 37 has structure having a constant closed cross-section and extends in the left-right direction. The width of an inner end of each of the left and right connection pieces 35 in the front-rear direction is larger than that of an outer end thereof. Further, the width of the intermediate beam 36, which is provided between inner ends of the left and right connection pieces 35, in the front-rear direction is larger than the width of each of the left and right beams 37, which extend from the outer ends of the left and right connection pieces 35, in the front-rear direction.

Each of the left and right sub-side members 34 has structure having a constant closed cross-section on the rear side of the left and right connection pieces 35 of the front sub-cross member 31, and extends in the front-rear direction. The cross-sectional shape of each of the left and right sub-side members 34 includes a rectangular hollow portion 38 and substantially horizontal flanges 39 that are formed at both lower ends of the rectangular hollow portion (see FIG. 5). The intermediate sub-cross member 33 is provided so that the intermediate portions of the left and right sub-side members 34 in the front-rear direction are connected by the intermediate sub-cross member 33 in the left-right direction.

The intermediate sub-cross member 33 includes an intermediate beam 41 that extends between the intermediate portions of the left and right sub-side members 34 in the front-rear direction, and left and right beams 42 that extend outward from the intermediate portions of the left and right sub-side members 34 in the front-rear direction, respectively. The intermediate beam 41 and the left and right beams 42 are integrally connected to each other by the intermediate portions of the left and right sub-side members 34 in the front-rear direction. That is, the intermediate sub-cross member 33 includes the intermediate portions of the left and right sub-side members 34 in the front-rear direction. Meanwhile, the intermediate sub-cross member 33 may not include a part of the left and right sub-side members 34 (the intermediate beam 41 and the left and right beams 42 may be directly connected to each other or may be connected to each other by members separated from the left and right sub-side members 34).

The intermediate beam 41 includes a bead portion 41a that is formed in the left-right direction at an intermediate portion of, for example, a substantially horizontal plate member in the front-rear direction. The intermediate beam 41 has a substantially constant cross-sectional shape, and extends in the left-right direction. The bead portion 41a protrudes downward from front and rear flat portions 41b that are formed on front and rear sides of the bead portion. The upper surfaces of the front and rear flat portions 41b at left and right ends of the intermediate beam 41 are attached to the lower surfaces of the inner flanges 39 of the left and right sub-side members 34 from the lower side, so that the intermediate beam 41 is integrally mounted to the left and right sub-side members 34.

Each of the left and right beams 42 has structure having a predetermined closed cross-section and extends in the left-right direction. The inner ends of the left and right beams 42 are attached to the outer flanges 39 of the left and right sub-side members 34 from the upper side and are attached to the outer walls of the hollow portions 38 from the side, so that the left and right beams are integrally mounted to the left and right sub-side members 34, respectively. The width of each of the left and right beams 42 in the front-rear direction is smaller than that of the intermediate beam 41 in the front-rear direction.

The rear sub-cross member 32 includes left and right connection pieces 43 and an intermediate beam 44, which are integrally connected to each other. The left and right connection pieces are connected to the rear ends of the left and right sub-side members 34. The intermediate beam 44 extends between the left and right connection pieces 43. The intermediate beam 44 has a predetermined closed cross-section structure and extends in the left-right direction. Both ends of the intermediate beam are attached to the inner surfaces of the rear ends of the left and right connection pieces 43. The width of each of the left and right connection pieces 43 in the left-right direction is smaller than that of each of the left and right sub-side members 34 in the left-right direction.

Front ends of the left and right extension members 45 extending in the front-rear direction are attached to the rear ends of the left and right connection pieces 43 of the rear sub-cross member 32, respectively. The rear ends of the left and right extension members 45 are connected to each other by an end member 46 extending in the left-right direction.

Mounting portions 47 and 48, which are to be mounted to the left and right side frames 18, respectively, are formed at the outer ends of the left and right beams 37 of the front sub-cross member 31 and at the outer ends of the left and right beams 42 of the intermediate sub-cross member 33. Further, mounting portions 49, which are to be mounted to the intermediate cross member 25, are formed at intersections of the end member 46 and the left and right extension members 45.

The sub-frame 7 is mounted to the left and right side frames 18 and the intermediate cross member 25 from the lower side of the vehicle body by the mounting portions 47, 48, and 49.

The fuel cell stack 2 is disposed on a portion of the sub-frame 7, which is surrounded by the front sub-cross member 31, the rear sub-cross member 32, and the left and right sub-side members 34 so that the stacking direction of the fuel cell stack is parallel to the front-rear direction. The fuel cell stack 2 has a rectangular parallelepiped shape elongated in the front-rear direction. The front end of the fuel cell stack is supported on the upper surface of the front sub-cross member 31 with a front bracket 31a interposed therebetween, and the rear end thereof is supported on the upper surface of the rear sub-cross member 32 with a rear bracket 32a interposed therebetween.

That is, the fuel cell stack 2 is supported by (connected to) the only front and rear sub-cross members 31 and 32 of the sub-frame 7, and is not supported by (connected to) the left and right sub-side members 34 and the intermediate sub-cross member 33. Further, as shown in FIG. 5A, a predetermined space S is formed between the lower surface of the fuel cell stack 2 and the upper surface of the intermediate beam 41 of the intermediate sub-cross member 33 that is positioned between the left and right sub-side members 34.

Since the intermediate sub-cross member 33 is provided between the left and right sub-side members 34, the intermediate sub-cross member 33 receives a load input to one sub-side member 34 from the side and then transmits the load to the other sub-side member 34. For this reason, when the side collision of a vehicle occurs, a side collision load is distributed to the left and right sub-side members 34 through the intermediate beam 41 of the intermediate sub-cross member 33. Accordingly, the deformation of the left and right sub-side members 34 toward the middle in the vehicle width direction, that is, toward the fuel cell stack 2 is suppressed.

Further, even when the intermediate beam 41 of the intermediate sub-cross member 33 bends (buckles) due to too large of a side collision load, the intermediate portion of the fuel cell stack 2 in the front-rear direction is not interfered by (come into contact with) the deformed intermediate beam 41 because the space S is formed between the intermediate beam 41 and the fuel cell stack 2.

In addition, the upper surfaces of the left and right ends of the intermediate beam 41 of the intermediate sub-cross member 33 are attached to the lower surfaces of the left and right sub-side members 34. Therefore, if a side collision load is input to one of the left and right sub-side members 34, the intermediate beam is bent so that the sub-side members 34 are tilted about the positions where the sub-side members are attached to the intermediate beam 41 (see FIG. 5B) and the intermediate beam 41 protrudes downward. As a result, the deformed intermediate beam 41 does not interfere with the fuel cell stack 2.

As described above, the sub-frame structure according to the embodiment includes front and rear sub-cross members 31 and 32 which support the front and rear ends of the fuel cell stack 2 on upper surfaces thereof and extend in the vehicle width direction, the intermediate sub-cross member 33 that is provided between the front and rear sub-cross members 31 and 32 and extends in the vehicle width direction, and a pair of (left and right) sub-side members 34 that connects the front and rear sub-cross members 31 and 32 and the intermediate sub-cross member 33 and extends in the front-rear direction along the side surfaces of the fuel cell stack 2. The intermediate sub-cross member 33 has a predetermined space S between the lower surface of the fuel cell stack 2 and itself, at a portion (intermediate beam 41) provided between the pair of sub-side members 34.

According to this structure, a load input to the sub-side member 34 from the side is received even in the intermediate sub-cross member 33 (intermediate beam 41) that is positioned below the fuel cell stack 2. For this reason, the sub-side member 34 does not deform easily even when the side collision of a vehicle occurs, and it is possible to suppress the transmission of a side collision load to the fuel cell stack 2. Further, since the intermediate sub-cross member 33 (intermediate beam 41) has a predetermined space S between the lower surface of the fuel cell stack 2 and itself, it is possible to suppress the interference between the intermediate sub-cross member 33 and the fuel cell stack 2 even when the intermediate sub-cross member 33 is bent due to a side collision load.

Furthermore, in the sub-frame structure, a portion of the intermediate sub-cross member 33, which is provided between the pair of sub-side members 34, is bent downward due to a predetermined side collision load. Therefore, even when the intermediate sub-cross member 33 having received the side collision load is bent, it is possible to further suppress the interference between the intermediate sub-cross member 33 and the fuel cell stack 2 that is provided on the intermediate sub-cross member.

Figure 6B:
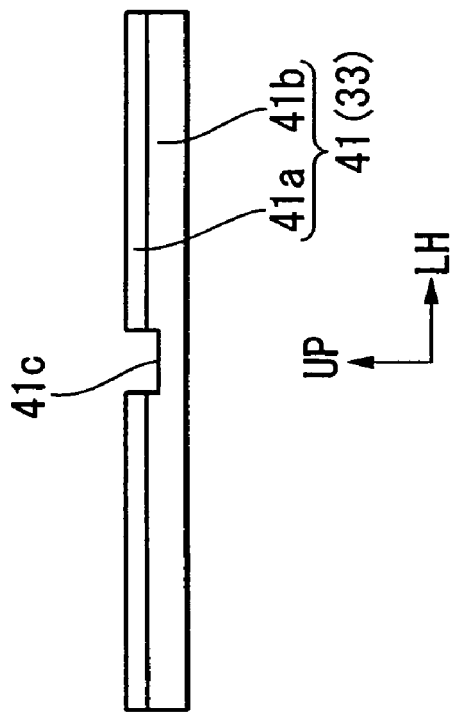
FIG. 6B is a front view showing another modified example of the intermediate beam of the intermediate sub-cross member.
Figure 6A:
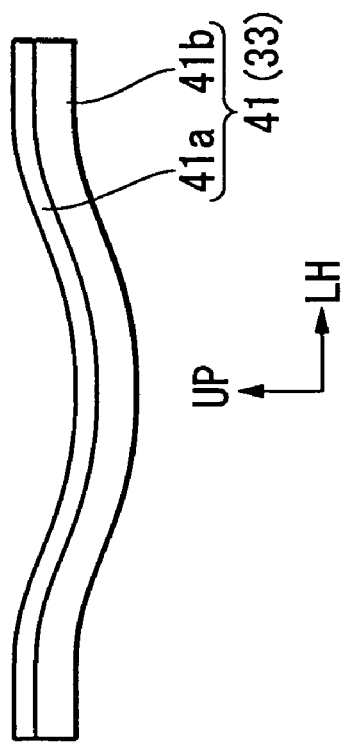
FIG. 6A is a front view showing an modified example of the intermediate beam of the intermediate sub-cross member.

Meanwhile, the present invention is not limited to the above-mentioned embodiment. For example, as shown in FIG. 6A, the intermediate beam 41 of the intermediate sub-cross member 33 may be formed in a downward convex shape. In addition, as shown in FIG. 6B, the fragile portion 41c having the shape of a notch or the like may be formed on the upper surface of the intermediate beam 41 so that the intermediate beam 41 bends downward when a side collision load is input.

Further, in the above-mentioned embodiment, the rear sub-cross member 32 is not mounted on the vehicle body. However, both ends of the rear sub-cross member 32 may extend to be mounted to the vehicle body.

While preferred embodiments of the present invention have been described and illustrated above, it should be understood that these are examples of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A sub-frame structure, which mounts a fuel cell thereon and is supported by a vehicle body, the sub-frame structure comprising:
    front and rear cross members which support front and rear ends of the fuel cell on upper surfaces thereof and extend in a vehicle width direction;
    an intermediate cross member that is provided between the front and rear cross members and extends in the vehicle width direction; and
    a pair of side members that connects the front and rear cross members and the intermediate cross member, and extends along side surfaces of the fuel cell,
    wherein a space having a predetermined size is formed between (a) a portion of the intermediate cross member, which is provided between the pair of side members, and (b) a lower surface of the fuel cell.

2. The sub-frame structure according to claim 1,
wherein the portion of the intermediate cross member bends downward when receiving a side collision load.

3. The sub-frame structure according to claim 1,
wherein the front cross member extends outward in the vehicle width direction, and is connected to a vehicle body frame provided in the vehicle body.

4. The sub-frame structure according to claim 1,
wherein the intermediate cross member includes an intermediate beam that has a horizontal plate member extending between the pair of side members.

5. The sub-frame structure according to claim 4,
wherein the intermediate cross member further includes an outer beam that has a closed cross-sectional shape at an outside of the intermediate beam in the vehicle width direction.

6. The sub-frame structure according to claim 5,
wherein the outer beam is connected to the vehicle body frame.

7. The sub-frame structure according to claim 5,
wherein the outer beam is connected to a side surface of the side member, and
the intermediate beam is connected to a lower surface of the side member.

8. The sub-frame structure according to claim 4,
wherein the intermediate beam includes a bead that protrudes downward and extends in the vehicle width direction.

9. The sub-frame structure according to claim 4,
wherein the intermediate beam protrudes downward along the vehicle width direction.

10. The sub-frame structure according to claim 4,
wherein the intermediate beam includes a notch at the upper surface thereof.

11. The sub-frame structure according to claim 1,
wherein the fuel cell is unconnected with the intermediate cross member.

* * * * *